INVENTOR
ORLAND E. ESVAL,
BY
Herbert H. Thompson
his ATTORNEY.

Aug. 18, 1942.    O. E. ESVAL    2,293,039
ARTIFICIAL HORIZON FOR SHIPS
Filed June 5, 1940    4 Sheets-Sheet 3

INVENTOR
ORLAND E. ESVAL,
BY
Herbert H. Thompson
his ATTORNEY

Aug. 18, 1942.    O. E. ESVAL    2,293,039
ARTIFICIAL HORIZON FOR SHIPS
Filed June 5, 1940    4 Sheets-Sheet 4

INVENTOR
ORLAND E. ESVAL,
BY
his ATTORNEY

Patented Aug. 18, 1942

2,293,039

UNITED STATES PATENT OFFICE 2,293,039

ARTIFICIAL HORIZON FOR SHIPS

Orland E. Esval, Allendale, N. J., assignor to Sperry Gyroscope Company, Inc., Brooklyn, N. Y., a corporation of New York Application June 5, 1940, Serial No. 338,846

13 Claims. (Cl. 33—204)

This invention relates to accurate gyro-verticals or artificial horizons for maintaining a horizontal reference plane on a non-stable vehicle, such as a ship. In a highly accurate device of this character, the rotation of the earth introduces an error which varies with the latitude of the ship, and by my invention improved means is devised whereby this latitude error may be eliminated in a very simple manner, preferably through the same device which is employed to erect the gyroscope from a pendulous base line. According to my invention, both the pendulous control and the earth's tilt control are put in electrically through the same erection device, all without touching the gyroscope or employing or connecting complicated rotating mechanism therewith.

Other objects of my invention will become apparent from the following description.

Referring to the drawings.

Figure 1:
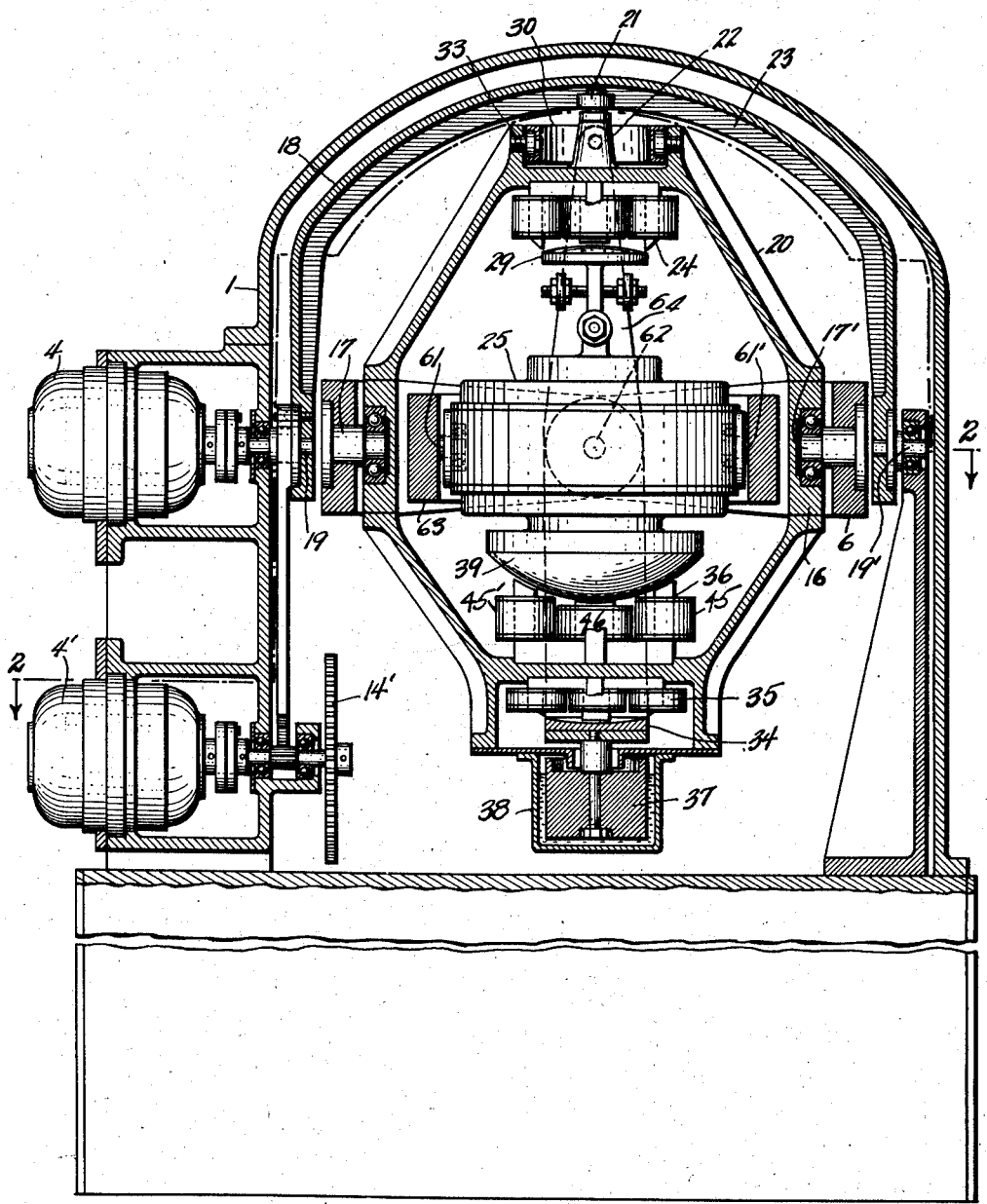
Fig. 1 is a vertical section through my improved gyro-vertical.
Figure 2:
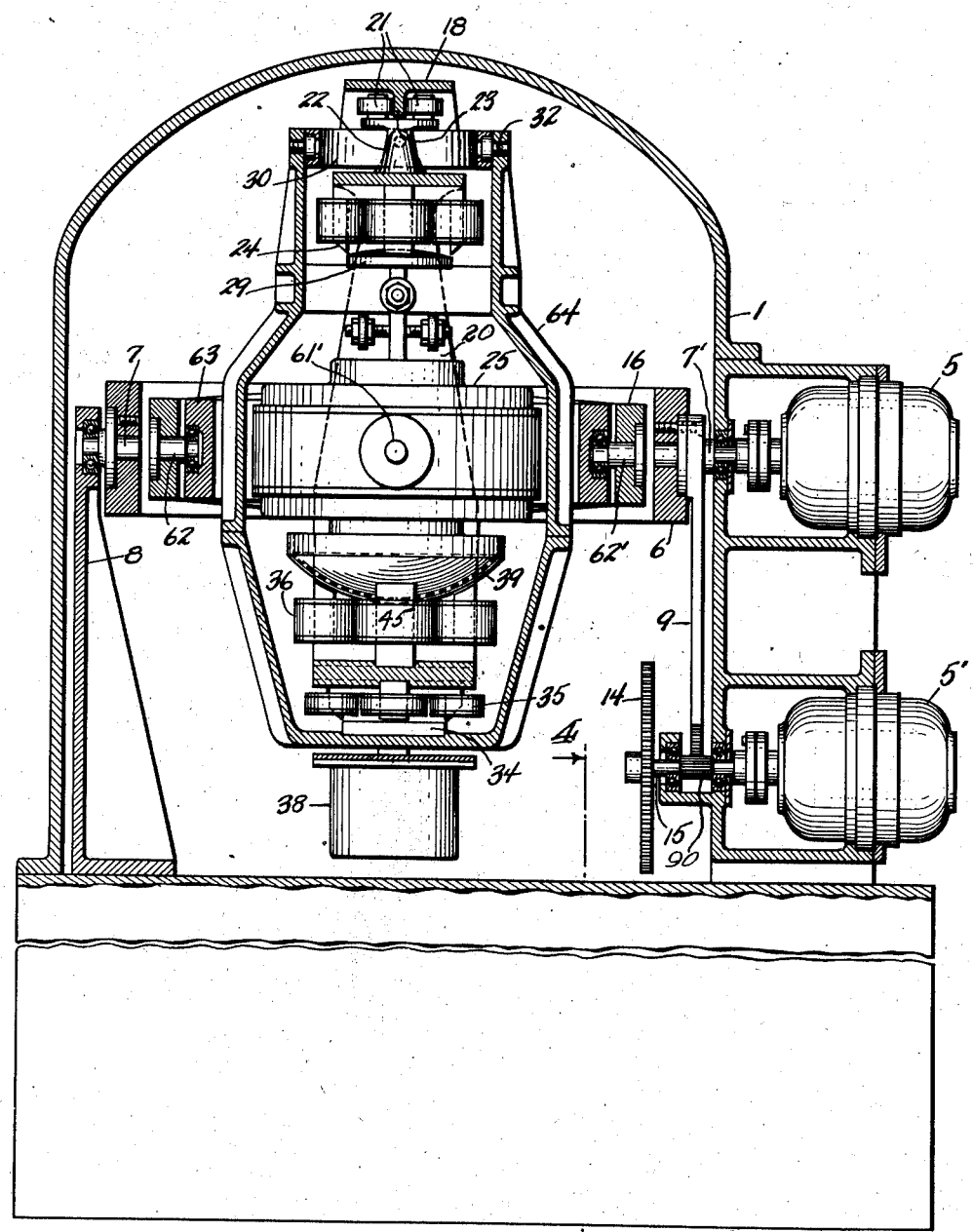
Fig. 2 is a vertical section of the same taken at right angles to Fig. 1.

My improved gyro-vertical is shown as mounted within an enclosing casing or housing 1 on which are supported the several follow-up motors 2 and 3 and the several transmitters 4, 4' and 5, 5' for transmitting the position of the gyro-vertical to a distance. Within said housing an outer gimbal ring 6 is pivotally supported on trunnions 7, 7' journaled in a bracket 8 at one end and in the frame 1 at the other end. The latter trunnion 7' is shown as directly driving the coarse transmitter 5 and as driving through gear sector 9 and pinion 90 the fine transmitter 5'. Said gear sector 9 is also geared to the follow-up motor 2 through pinion 11 thereon, meshing with a gear 12. Pinion 13 on the shaft of the gear 12 meshes with a gear 14 on the shaft 15 of motor 5'. The follow-up motor 2, therefore, not only positions the outer gimbal ring 6 but also drives the coarse and fine transmitters 5 and 5'.

The second ring 16 is pivoted on transverse trunnions 17 and 17'. A follow-up motor 3 around this axis and the coarse and fine transmitters 4 and 4' are connected in a similar fashion to a loop or bale 18 pivoted on axis 19, 19' normally in line with trunnions 17 and 17'. Within the ring 16 is universally mounted the gyro proper 25 in neutral equilibrium. To this end, the gyro casing is pivotally supported on trunnions 61 and 61' in a gimbal ring 63 which, in turn, is pivotally supported in ring 16 on major trunnions 62 and 62'. On ring 16 there is also supported the follow-up, open frame-work or support 20. At its top, said framework is slidably connected with the bale 18 through rollers 21 mounted on top of a post 22 on opposite sides of the track-way or annular flange 23 on the bale. The framework is also shown as carrying at its top one portion of a suitable electric controller 24 for controlling the operation of the follow-up motors 2 and 3 in accordance with the position of the gyroscope proper 25, the motor 2 positioning the ring 6 about the major axis 7—7' through reduction gearing 11—14, and the motor 3 positioning the bail 18 through similar reduction gearing 11'—14' and trunnion 19, the bail in turn transmitting its movement about axis 19, 19' to the framework 20 and inner gimbal 16 to position it about the minor trunnion axis 17, 17'. The frame 20 is therefore stabilized at all times from the gyro 25 by means of the controller 24—29 controlling the operation of the follow-up motors 2 and 3.

Figure 3:
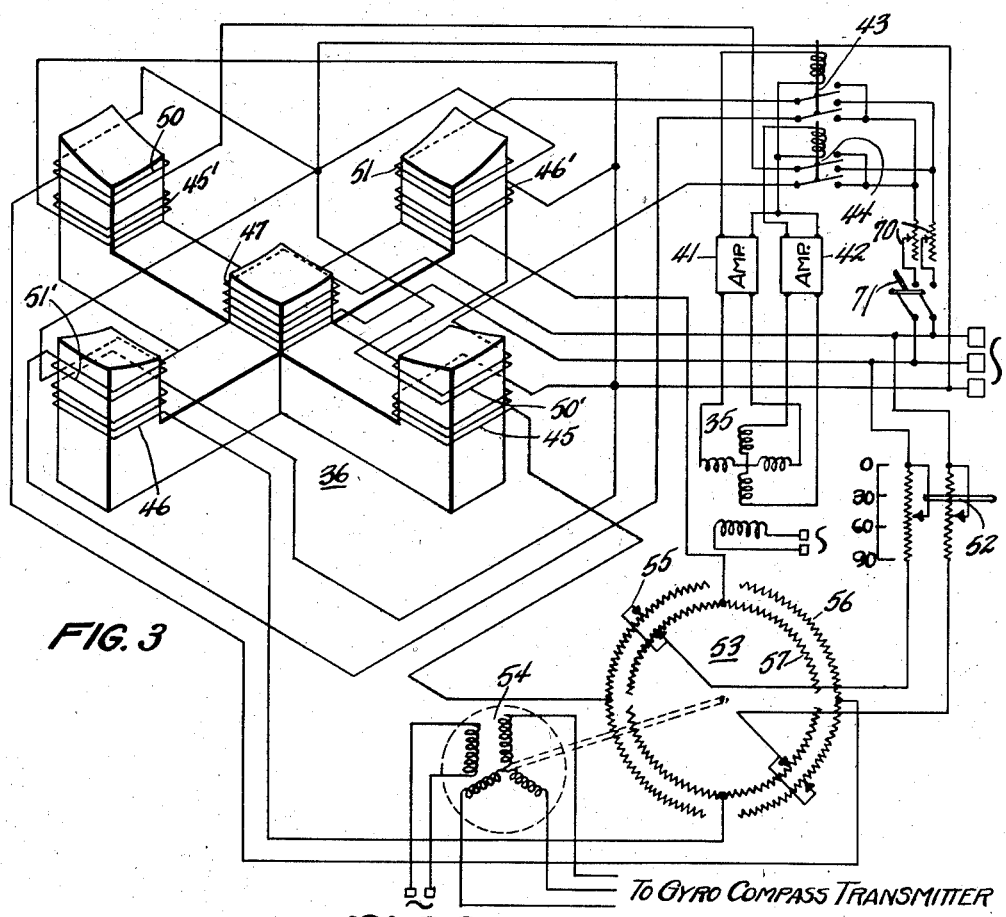
Fig. 3 is a wiring diagram showing the application of the latitude correction mechanism.
Figure 4:
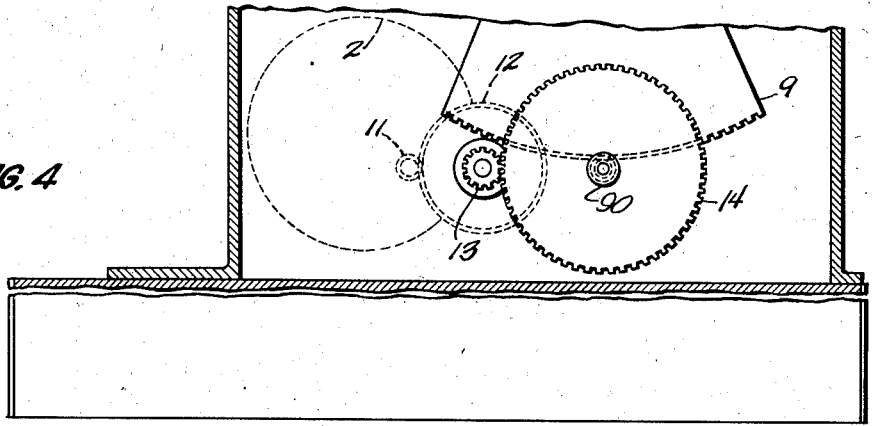
Fig. 4 is a detail showing the follow-up motor drive to the gyroscope.
Figure 5:
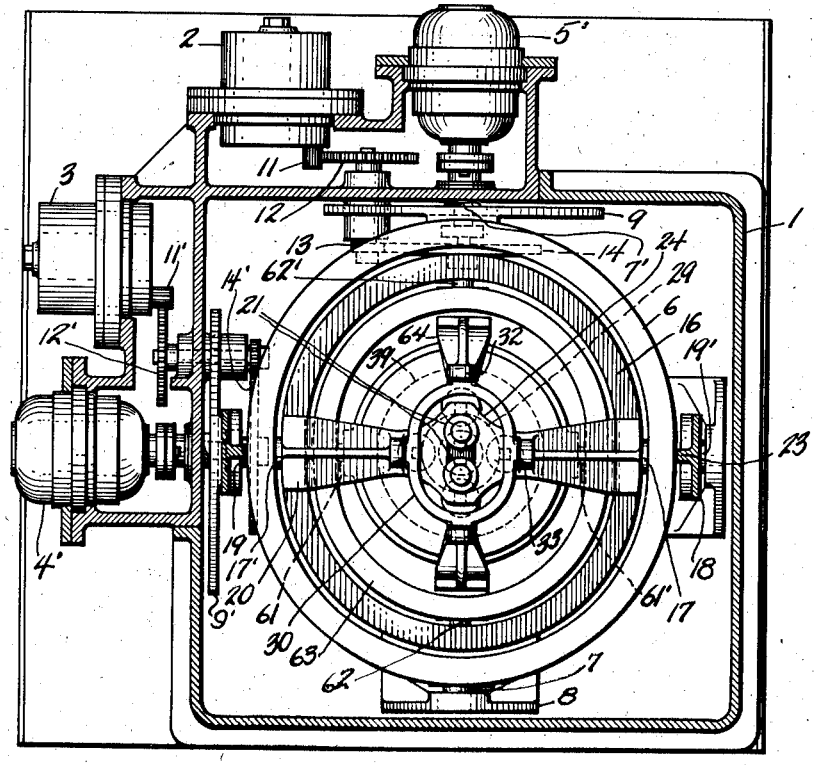
Fig. 5 is a plan view, partly in section, of my gyro-vertical, taken along line 2—2 of Fig. 1.

Said controller is shown as made in the form of a cruciform or five pole, multi-wound inductor or transformer somewhat similar to the transformer 36 shown in Fig. 3 but having only one set of windings per pole. The armature 29 mounted on top of the gyro case is shown as in the form of a button, preferably having a low reluctance and relatively high resistance, such as perminvar. Any relative tilting of the gyro and follow-up ring results in a signal being generated in the secondary transformer windings in the plane of the tilt and the consequent actuation of the proper follow-up motor causes the follow-up frame to follow the gyroscope as is particularly explained in the prior patent to Gillmor and Wittkuhns, No. 1,984,874, dated December 18, 1934, for Gyro-verticals. The amplifying circuits between the controller and the follow-up motor are therefore not shown in this application.

Also at the top is universally pivoted on the framework through the intermediary of gimbal ring 30, a pendulous U-shaped frame 64, said frame being shown as pivoted to the gimbal ring on axis 32 and the gimbal ring in turn being pivoted within the frame 20 on axis 33. The U-shaped pendulum carries at its bottom, the armature portion 34 of a second inductive pick-off which may be similar to the inductor 24. In this case, the transformer windings 35 are mounted on the bottom of the frame 20. Upon a relative tilt of the pendulum and support 20 a signal is generated which is amplified to energize an electrical torque applying device 36 for exerting an erecting torque on the gyroscope in the proper direction and in the proper plane. The pendulum may be suitably damped by means of a blade member 37 attached thereto dipping into an oil container 38 on the bottom of the frame 20.

The erecting device 36 is preferably of the form shown in my prior patent (joint with Carl A. Frische) No. 2,270,876, dated January 27, 1942, for A. C. coercing means for gyroscopes. According to this arrangement there is mounted cruciform poles and windings preferably on the member 20 which cooperate with a spherical button 39 on the bottom of the gyro casing. Said "button" is preferably of sheet metal having a low resistance and high reluctance, such as copper. The signal produced by the inductive pick-off 34—35 is sent through one or the other amplifiers 41—42 which control relays 43 and 44 to close an alternating current circuit in one direction or the other through windings 45 and 45' and 46 and 46' on the outer poles of the torque applying device. The central pole is shown as continuously excited by coil 47 from one phase of the three-phase supply.

As explained in the aforesaid patent, the arrangement is such that for tilt in one direction in the plane of major trunnions 7 and 7' for instance, alternating current of predetermined phase relation to that in coil 47 is sent through the coils 45 and 45' so as to create an electromotor action through eddy current effect to apply a torque through the spherical button 39 to the gyroscope at right angles to the tilt and in the proper direction to erect the same. In case of opposite tilt the phase in coils 45 and 45' is reversed to reverse the torque. Similarly, for tilt about the other axis, the other windings 46 anl 46' are excited with one phase or the reverse.

While superfiicially the torque applying device 36—39 has somewhat the same appearance and construction as the inductive pick-offs 24 and 35, their purpose and action are quite different. In the inductive pick-offs, a very small exciting current is employed so that little or no torque is exerted thereby on the gyroscope or pendulum as the case may be. In this case also, the button preferably does not extend beyond the tapered outer poles and is made of a substance having both low reluctance and preferably high resistance so that there is a large change in the reluctance of the path between poles for small tilts while eddy currents and direct magnetic pull are kept a minimum. On the other hand, for the torque applying device 36—39, the output from the inductive pick-up 35 is greatly amplified through the amplifiers 41 and 42 so that appreciable currents are circulated through the coils, 45, 46, etc. the center winding, in fact, being shown as excited directly from the A. C. supply. Also, the button or stator 39 is made of a material to give a maximum eddy current effect, for which purpose, sheet copper is preferably employed with no change in reluctance for all ordinary tilts. To this end, also, the button extends materially beyond the poles, as shown, so as not to vary the torque or reluctance for usual tilts, and the pole faces have a substantial area.

While such an arrangement will maintain a substantially horizontal plane it will need continuous correction and will show a resultant error unless the gyroscope is corrected for the effect of the earth's rotation. The rate of tilt due to this cause is known for each position on the earth's surface, being in the E-W plane and proportional to the cosine of the latitude. I, therefore, propose to apply a torque on the gyroscope in the proper plane azimuth to create a counter-precession in the E-W plane at a rate sufficient to overcome the tilt otherwise caused by the earht's rotation.

A very simple method of accomplishing this result is by applying this torque through the same torque applying device 36—39 that is governed by the pendulum 64. To this end, I place additional windings 50 and 50' and 51 and 51' on the outer poles of the torque device and control the same from a comptroller 52 of some suitable type which may be set in accordance with the latitude. In order that this torque may be applied in the E-W plane, I also provide a resolving mechanism 53 oriented from a repeater motor 54 controlled from an azimuth indicator such as a gyro compass and by which component voltages are so distributed between the poles, or by which the space field is created by the pole windings in such manner that while the resultant torque is kept constant, it is oriented so as to divide into components in the planes of the gyro trunnions with respect to the E-W plane. To this end, the repeater motor 54 maintains a rotary contact arm 55 relatively fixed in azimuth. Said arm is shown as carrying sliders contacting with mid-tapped potentiometer windings 56 and 57. The two pairs of sliders are shown as connected to the controller 52 while the potentiometer windings are connected to windings 51 and 51' and 50 and 50' thereby resolving the applied E. M. F. and therefore corrective torque into two components which are functions of the angles made by the gyro gimbal axis 61 and 61' and 62 and 62', and an E-W plane. The potentiometers are suitably tapered to produce voltages of predetermined functions of the angles.

I also may provide means for varying the rate of erection of the gyroscope as controlled from the pendulum 64. This may be done very simply by means of variable resistances 70 placed in the A. C. supply to the windings 45, 45', 46, 46' on the torque applying device 36.

It has also been found desirable to eliminate the erection force during turns or other acceleration of the ship. On the other hand, I prefer to maintain the latitude corrective torque at all times. In order to accomplish this purpose, I have shown a switch 71 placed in the main supply leading to coils 45, 45', 46, 46', but not in the supply to the auxiliary coils 50, 50', 51, 51'. It will be understood that this switch may be operated either manually during the turns or other acceleration of the ship, or automatically, as shown in the prior patent to Wittkuhns and Anscott, No. 2,093,503, dated September 21, 1937, for Artificial horizons.

It will therefore be seen that I have provided a very simple means of relieving the pendulous control for a gyro vertical of the duty of continually precessing the gyro against the earth's rotation and thereby obtain through the pendulous control much closer accuracy of the gyro vertical. Also, it is evident that when the pendulous control is suspended as in turns and other accelerations of the craft, there will be no tendency for the gyro to drift westward as an otherwise free gyro would do. Also, the pendulous control can be adjusted to any rate at will without affecting the tendency of the gyro to drift westward.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I desire to secure by Letters Patent is:

1. In a gyro vertical for ships and the like, the combination with a support and a gyroscope universally supported in neutral equilibrium on said support, electrical means for maintaining the gyroscope vertical comprising inductively related relatively movable members carried, respectively, by said gyroscope and by said support, one of said members being adapted to electrically produce a moving flux field and the other of said members cutting said field for producing torques about one or the other of the horizontal axes of said gyroscope, and means for controlling said moving flux field as to space phase and strength in accordance with the compass heading and latitude of the ship, respectively.

2. In a gyro vertical for ships and the like, the combination with a support and a gyroscope universally supported in neutral equilibrium on said support, electrical means for maintaining the gyroscope vertical comprising inductively related relatively movable members carried, respectively, by said gyroscope and by said support, one of said members electrically producing a moving flux field and the other of said members cutting said field for producing a torque about a horizontal axis of said gyroscope, means for supplying alternating current to the member producing said field, gravitationally responsive means mounted separately from the gyroscope, and an inductive pick-off between said gyroscope and gravitational means for varying said moving flux field as to direction and strength in accordance with the direction and amount of relative tilt between the gyroscope and gravitational means.

3. In a gyro vertical for ships and the like, the combination with a support and a gyroscope universally supported in neutral equilibrium on said support, electrical means for maintaining the gyroscope vertical comprising inductively related relatively movable members carried, respectively, by said gyroscope and by said support, one of said members electrically producing a moving flux field and the other of said members cutting said field for producing a torque about a horizontal axis of said gyroscope, gravitationally responsive means, a pick-off operating between said means and gyroscope for controlling said moving flux field to apply corrective torques to the gyroscope upon tilt thereof, and additional means for controlling said moving flux field in accordance with latitude and compass heading of the ship.

4. In a gyro vertical for ships and the like, the combination with a gyroscope universally supported in neutral equilibrium, electrical means for maintaining the gyroscope vertical including inductively related relatively movable members, one of which is carried by the gyroscope and the other independently mounted, one of said members electrically producing a moving flux field and the other of said members cutting said field for producing a torque about the horizontal axis of the gyroscope, means for supplying alternating current to the member producing said field, gravitational means responsive to tilt of said gyroscope, and inductive pick-off means including an amplifier associated with said tilt responsive means for controlling said field as to space phase and strength.

5. As a means for preventing tilt due to the earth's rotation in a gyro-vertical universally mounted on a dirigible craft having a compass, means for electrically producing a moving flux field and to produce thereby a torque about each axis of the gyroscope, a repeater compass controlled by said first named compass and a controller rotated by said repeater compass for so controlling the space flux of said field as to maintain the axis of the resulting torque in an east-west plane regardless of orientation of the craft.

6. In a gyro vertical for moving vehicles, the combination including a universally mounted gyroscope, a torque applying device for maintaining said gyroscope erect and comprising means for creating a moving magnetic field and torque exerting means responsive to said field, a gravitationally responsive device for controlling said torque applying device, further means for controlling the strength of the moving field of said torque applying device so as to cause an easterly precession of said gyroscope at a rate to correct for the westward drift due to the earth's rotation, and means whereby only the control of said gravitational device may be rendered inoperative during turns of the vehicles.

7. In a gyro vertical for moving vehicles, the combination including a universally mounted gyroscope, means for maintaining said gyroscope erect comprising means for creating a moving magnetic field, and means responsive to said field for applying a torque to said gyroscope, a gravitationally responsive device for controlling said field creating means, further means for controlling the strength of the moving field of said torque applying device so as to cause an easterly precession of said gyroscope at a rate to correct for the westward drift of said gyroscope due to the earth's rotation, and means for varying the torque controlled by said first field controlling means without affecting the torque controlled by said second field controlling means.

8. In a gyro vertical for a vehicle, the combination including a support, a gyro universally mounted on said support, electrical means for maintaining said gyro in a vertical position comprising inductively-related relatively movable members carried by said gyro and said support, one of said members being adapted to electrically produce a moving flux field and the other member being adapted to produce a torque about a horizontal axis of said gyro under the influence of said moving field, and means for controlling the strength of said moving field in accordance with the latitude of said vehicle.

9. In a gyro vertical for a vehicle, the combination including a support, a gyroscope universally mounted on said support, electrical means for maintaining said gyroscope in a vertical position comprising inductively-related relatively movable members carried by said gyro and by said support, respectively, one of said members being adapted to produce a moving flux field and the other member being adapted to produce a torque about a horizontal axis under the influence of said moving field, and means for controlling the direction of motion of said field in accordance with the heading of said vehicle.

10. A gyro vertical as in claim 8 further comprising means for controlling the direction of motion of said moving field in accordance with the heading of said vehicle.

11. In a gyro vertical for a vehicle, the combination including a support, a gyroscope universally mounted on said support, electrical means for maintaining the gyroscope in a vertical position comprising inductively-related relatively movable members carried respectively by said gyroscope and by said support, one of said members being adapted to produce a moving magnetic field and the other of said members being adapted to produce a torque about a horizontal axis under the influence of said moving field, gravitationally responsive means for controlling said moving field to apply corrective torque to said gyroscope upon tilt of said gyroscope with respect to said gravitationally responsive means, means for superposing a second moving flux field upon said first field, and means for controlling said second field in accordance with the latitude of said craft.

12. In a gyro vertical for a vehicle, the combination including a support, a gyroscope universally mounted on said support, electrical means for maintaining the gyroscope in a vertical position comprising inductively-related relatively movable members carried respectively by said gyroscope and by said support, one of said members being adapted to produce a moving magnetic field and the other of said members being adapted to produce a torque about a horizontal axis under the influence of said moving field, gravitationally responsive means for controlling said moving field to apply corrective torque to said gyroscope upon tilt of said gyroscope with respect to said gravitationally responsive means, means for superposing a second moving flux field upon said first field, and means for controlling said second field in accordance with the heading of said vehicle.

13. In a gyro vertical as in claim 11, further comprising means for controlling said second field in accordance with the heading of said vehicle.

ORLAND E. ESVAL.